United States Patent [19]
Wolf

[11] Patent Number: 5,816,659
[45] Date of Patent: Oct. 6, 1998

[54] TEMPORARY SEAT FOR VEHICLES

[76] Inventor: B. Andrew Wolf, 17 Topping La., St. Louis, Mo. 63131

[21] Appl. No.: 835,764

[22] Filed: Apr. 8, 1997

[51] Int. Cl.[6] ............................... A47C 5/00; B60N 2/24
[52] U.S. Cl. .............................. 297/452.1; 297/440.12; 297/452.12
[58] Field of Search ........................... 297/440.1, 440.12, 297/452.1, 452.12

[56] References Cited

U.S. PATENT DOCUMENTS

| | | | |
|---|---|---|---|
| 3,866,550 | 2/1975 | Geschwender . | |
| 3,982,057 | 9/1976 | Briggs et al. | 428/73 |
| 4,526,421 | 7/1985 | Brennan et al. | 297/232 |
| 4,875,737 | 10/1989 | Carderers | 297/440.12 |
| 4,934,756 | 6/1990 | Webb et al. | 297/440.12 |
| 5,269,219 | 12/1993 | Juvik-Woods | 108/51.3 |
| 5,445,435 | 8/1995 | Sheckles | 297/440.12 |
| 5,463,965 | 11/1995 | Cordrey | 108/51.3 |
| 5,493,962 | 2/1996 | McCarthy | 108/51.3 |
| 5,617,595 | 4/1997 | Landi et al. | 5/653 |

FOREIGN PATENT DOCUMENTS

| | | | |
|---|---|---|---|
| 388542 | 9/1990 | European Pat. Off. | 297/452.12 |

*Primary Examiner*—Peter R. Brown
*Attorney, Agent, or Firm*—Senniger, Powers, Leavitt & ROedel

[57] ABSTRACT

A temporary seat, permitting a driver to sit on the metal seat frame of a vehicle to drive the vehicle prior to installation of a permanent seat for the vehicle comprises a generally rectangular seat core made of pasteboard supported and on the metal seat frame. The seat core has an upper surface, a lower surface and a cellular construction spacing the upper and lower surfaces for resisting compressive forces tending to move the upper surface toward the lower surface and bending forces tending to bend the upper and lower surfaces out of their planes when the driver sits on the temporary seat. A seat cover of the temporary seat comprises a one piece sheet of pasteboard having fold lines. The seat cover includes a bottom panel generally underlying the lower surface of the seat core and having openings and receiving fasteners into the seat core to secure the temporary seat on the metal frame. An end panel extends upwardly from a fold line at a forward end of the bottom panel and covers at least a portion of a forward end of the seat core. A top panel of the seat cover extends rearwardly from a fold line at the top of the end panel and generally overlies the upper surface of the seat core to provide a surface on which the driver may be seated. A back support extends upwardly from a fold line at a rear edge of the top panel for engaging the driver's body to inhibit the driver from sliding backwards off of the temporary seat.

12 Claims, 5 Drawing Sheets

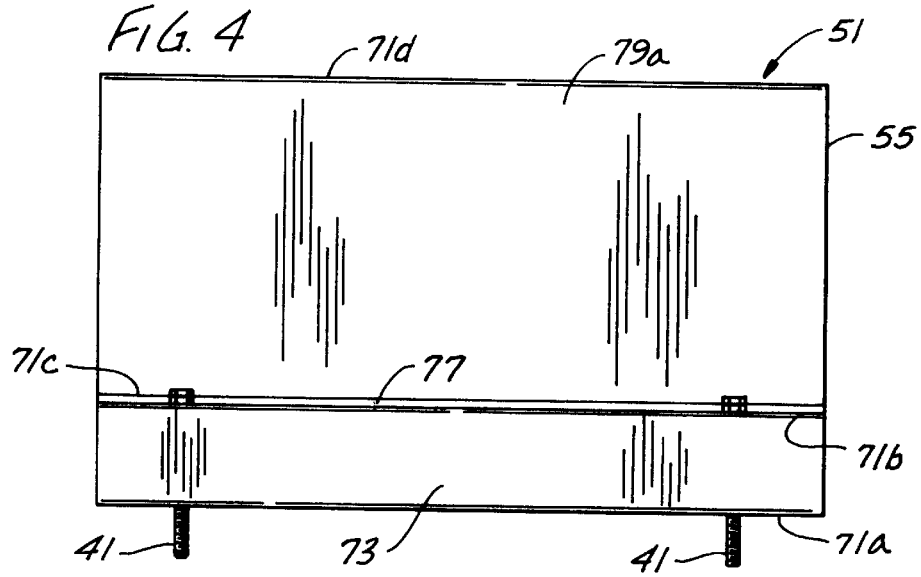
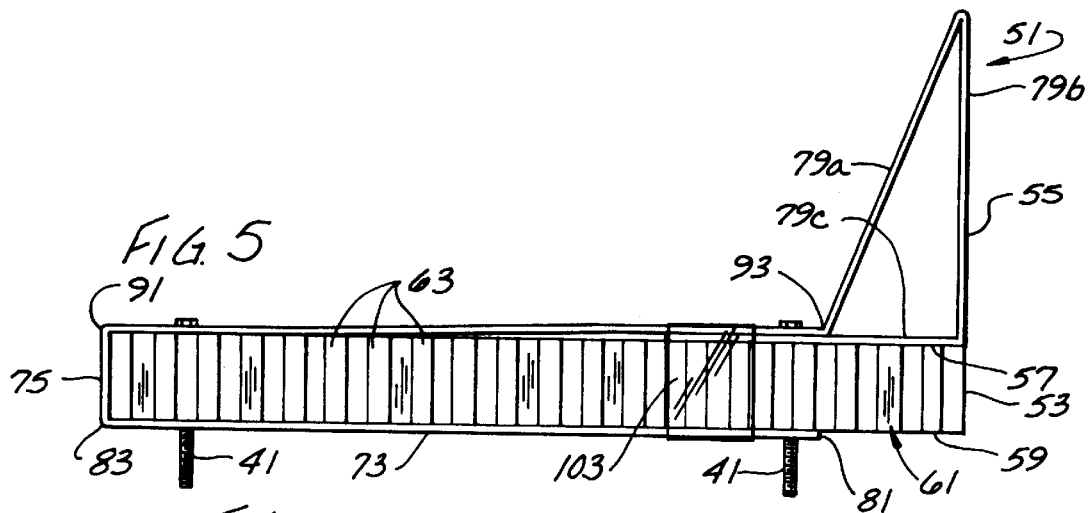
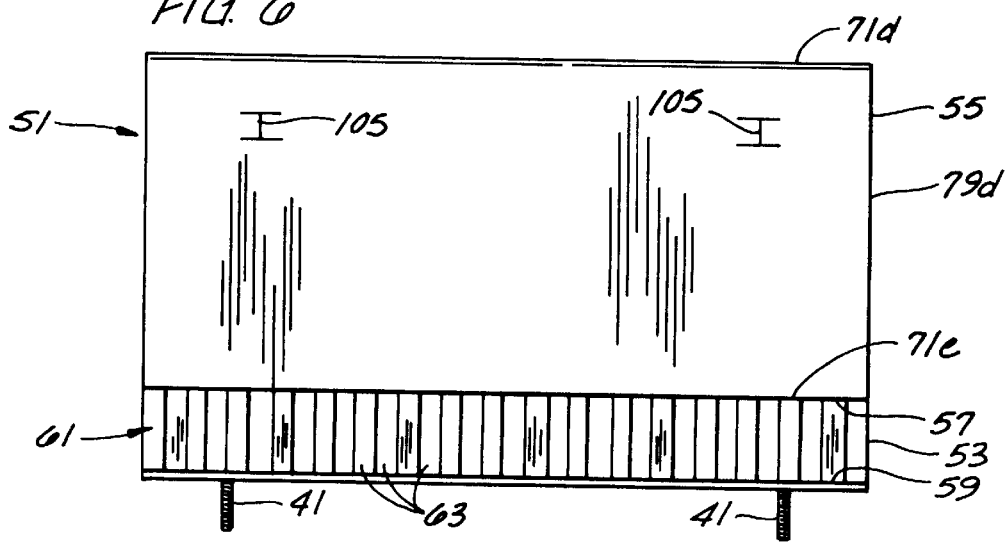

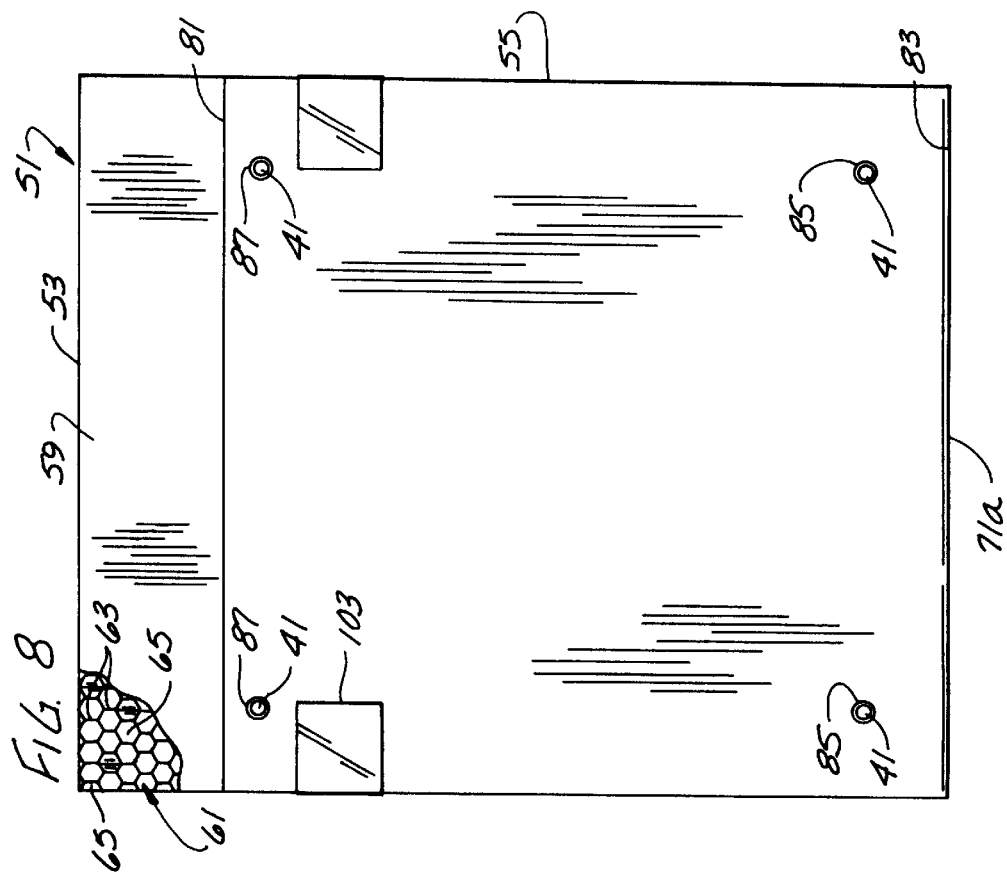
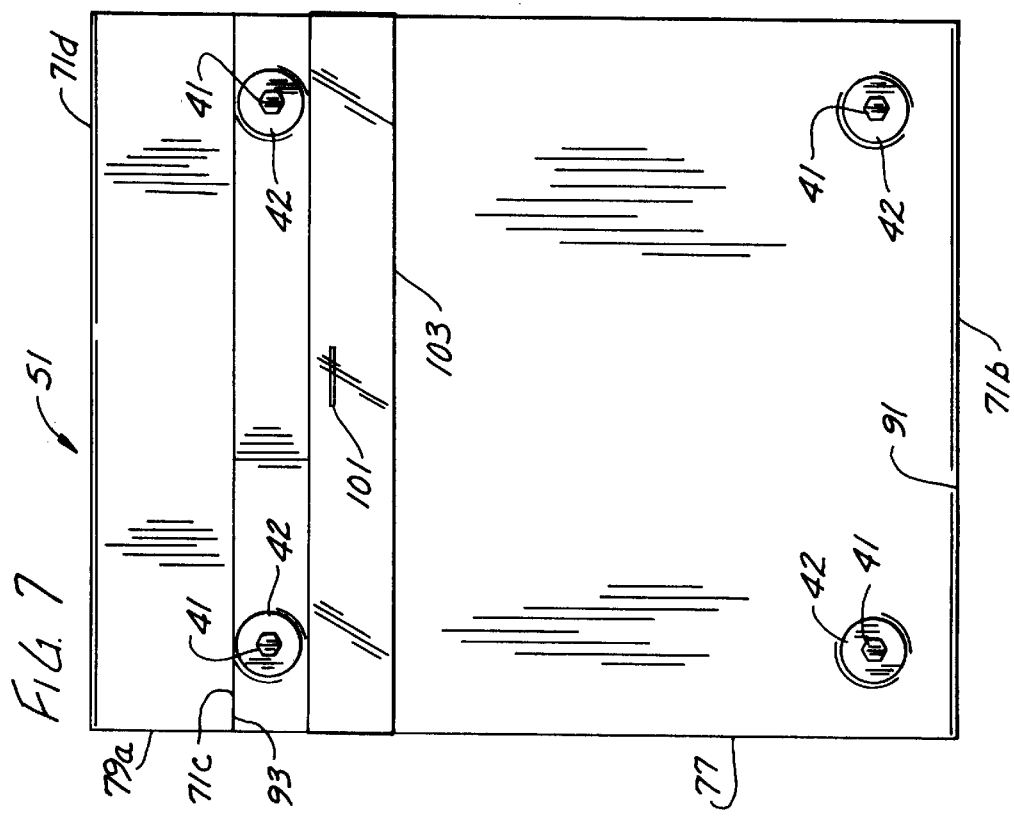

TEMPORARY SEAT FOR VEHICLES

BACKGROUND OF THE INVENTION

This invention relates generally to temporary seats, and more particularly to temporary seats for vehicles that permit the vehicle to be driven prior to installation of a permanent seat for the vehicle.

Vehicles such as trucks and vans are commonly "customized" by customizers and detailers who install specialized permanent seats, dashboards, or other interior comforts in the vehicle. Vehicles to be customized are initially assembled at an original manufacturing site to include metal seat frames secured within the vehicle upon which permanent seats are later mounted. The vehicle must usually be transported to the customizer at sites remotely located from the original manufacturing site. To transport the vehicles to the customizers, a temporary seat is mounted on the metal seat frame at the driver's location and the vehicle is driven to its remote destination. In practice, these temporary seats are used only once, wherein after the vehicle is transported to the customizer, the temporary seat is removed from the metal seat frame and discarded.

The metal seat frames installed in the vehicles typically include a base, mounting rails secured to the top of the base on which the permanent seat is later mounted, and mounting brackets adapted for receiving fasteners to secure the permanent seat on the base. Prior to the present invention, it was known to provide temporary seats constructed of a pair of wooden supports capable of mounting on the mounting brackets of the seat frame and a cardboard cushion placed over the wooden support members to provide a surface upon which the driver may sit. The cardboard cushion is corrugated and folded over on itself two to three times to form a stiffened cushion. The cushion is placed over the wooden support members and a set of bolts extend through the cushion and the wooden support members and are engaged with the mounting brackets of the seat frame to secure the temporary seat on the seat frame. These temporary seats may also include a back support constructed of corrugated cardboard folded into a two-panel, triangular shape. The rear panel of the back support is stapled to the wooden support members.

There are a number of disadvantages associated with these conventional temporary seats. One such disadvantage is that the seat does not provide sufficient support for the driver and often bows or collapses under the driver's weight. This can result in damage to the thread pattern of the threaded openings in the seat frame mounting brackets, requiring replacement of the mounting brackets or even the entire seat frame. Additionally, the bolts securing the temporary seat to the mounting rails are often bent during transport and become difficult to remove from the wood supports. Another disadvantage is that the bolt hole patterns in the wooden supports are often non-uniform because of warpage or shrinkage of the wood. It is also common for the staples securing the back support to the wooden support members to work loose, causing the back support to collapse. Moreover, these temporary seats are expensive to manufacture in view of their intended use as a disposable item.

SUMMARY OF THE INVENTION

Among the several objects and features of the present invention may be noted the provision of a temporary seat which can be mounted on a metal seat frame; the provision of such a temporary seat which is capable of supporting a driver; the provision of such a temporary seat which will not bow or bend excessively, collapse or fall apart during use; the provision of such a temporary seat which is easily and quickly assembled; the provision of such a temporary seat which is of economical construction; and the provision of such a temporary seat which is light weight and easy to dispose of after being used.

Briefly, the present invention comprises a metal seat frame fixedly installed in a vehicle, in combination with a temporary seat for permitting a driver to sit on the metal seat frame to drive the vehicle prior to installation of a permanent seat for the vehicle. Generally, the temporary seat comprises a generally rectangular seat core of pasteboard supported on the metal seat frame. The seat core has an upper surface, a lower surface and a cellular construction spacing the upper and lower surfaces for resisting compressive forces tending to move the upper surface toward the lower surface and bending forces tending to bend the upper and lower surfaces out of their planes when the driver sits on the temporary seat. A seat cover of the temporary seat comprises a one piece sheet of pasteboard having fold lines. The seat cover includes a bottom panel generally underlying the lower surface of the seat core and having openings therein and receiving fasteners into the seat core securing the temporary seat on the metal frame. An end panel extends upwardly from a fold line at a forward end of the bottom panel and covers at least a portion of a forward end of the seat core. A top panel of the seat cover extends rearwardly from a fold line at the top of the end panel and generally overlies the upper surface of the seat core to provide a surface on which the driver may be seated. A back support extends upwardly from a fold line at a rear edge of the top panel for engaging the driver's body to inhibit the driver from sliding backwards off of the temporary seat.

Other objects and features will become in part apparent and in part pointed out hereinafter.

BRIEF DESCRIPTION OF THE DRAWINGS

FIG. 4 is a front elevation of the temporary seat;

FIG. 5 is a side elevation thereof;

FIG. 6 is a rear elevation thereof;

FIG. 7 is a top view thereof; and

FIG. 8 is bottom view of the temporary seat with a portion of a seat core of this invention broken away to show internal construction.

Corresponding parts are designated by corresponding numerals throughout the several views of the drawings.

DESCRIPTION OF THE PREFERRED EMBODIMENT

Figure 1:
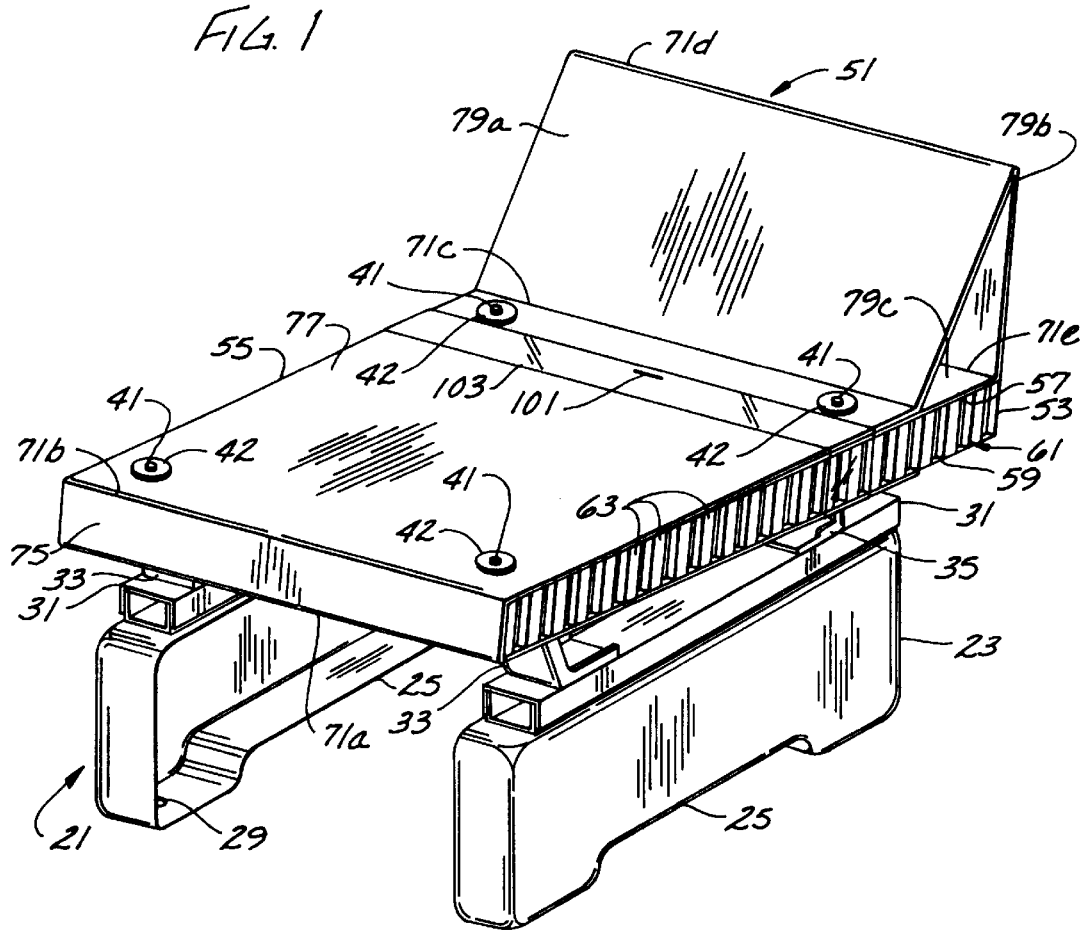
FIG. 1 is a perspective view of a temporary seat and metal seat frame of this invention.
Figure 2:
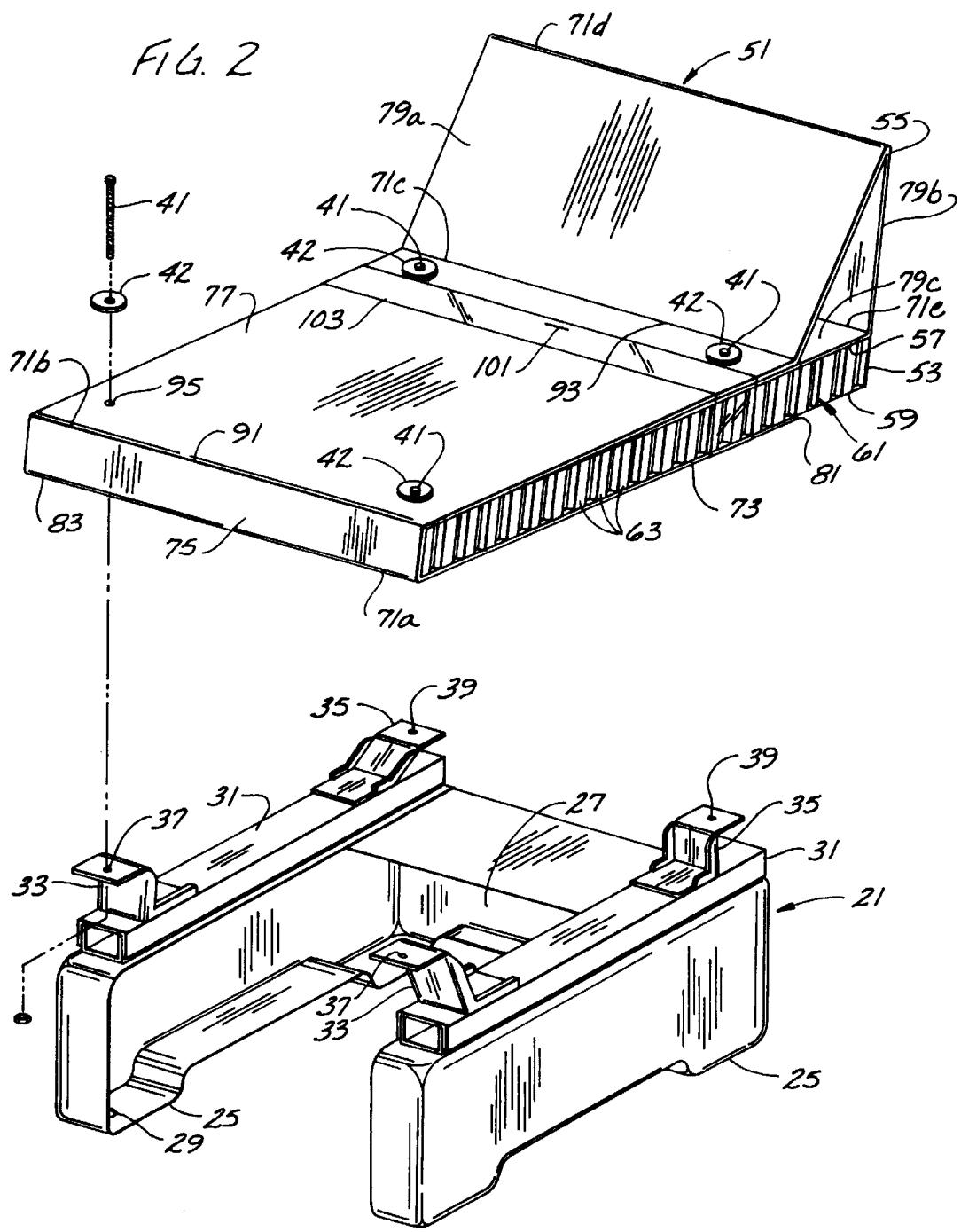
FIG. 2 is an exploded view of FIG. 1.

Referring now to the drawings, and in particular to FIGS. 1 and 2, a metal seat frame adapted for installation in a vehicle (not shown), such as a truck or a van, is designated generally by the reference numeral 21. The metal seat frame 21 is preferably constructed from steel or other suitable metal and comprises a generally U-shaped base 23 having a pair of side frame members 25 and a rear frame member 27. Openings 29 (only one of which is shown in FIGS. 1 and 2) in the bottom of the side frame members 25 are provided for fixedly installing the seat frame in the vehicle using suitable fasteners. Mounting rails 31, having a length substantially equal to that of the side frame members 25, are mounted respectively on the top of the side frame members. Front and rear mounting brackets 33, 35 connected to the top of each mounting rail 31 extend upward from the mounting rails and have threaded openings 37, 39 for receiving suitable fasteners, such as conventional threaded bolts 41, for releasably mounting a permanent seat (not shown) on the metal seat frame 21. The front brackets 33 extend further upward than the rear brackets 35 so that a seat slopes downward toward the rear when the seat is mounted on the metal seat frame 21. The precise configuration of the metal seat frame 21 may be other than described without departing from the scope of the present invention. It is envisioned that materials other than metal could be used, so long as they are sufficiently robust to function as permanent seat supporting structure.

A temporary seat constructed according to the principles of the present invention is designated in its entirety by the reference numeral 51 and is adapted for mounting on the metal seat frame 21 to support a driver of the vehicle prior to installation of the permanent seat on the seat frame. As shown in FIG. 1, the temporary seat comprises a seat core, generally designated 53, and a seat cover, generally designated 55. The seat core 53 is a double-faced, cellular structure constructed of pasteboard, preferably cardboard, chipboard or paperboard, and having a top sheet 57 defining an upper surface of the seat core, a bottom sheet 59 defining a lower surface of the seat core and a core member, generally indicated at 61, comprising a cellular construction spacing the top and bottom sheets. It is understood that other paper materials may be used in construction of the seat core without departing from the scope of this invention.

The cellular construction of the core member 61 comprises a plurality of vertically extending cells 63 interconnected in side-by-side relationship so that adjacent cells share a common wall. Open ends 65 of the cells 63 are closed by the top and bottom sheets 57, 59, which are suitably secured to the core member 61, such as by gluing the ends 65 of the cells 63 together with the top and bottom sheets. The upper and lower surfaces defined by the top and bottom sheets 57, 59 provide a smooth, protective surface over the cells 63 to inhibit damage to the individual cells and to distribute compressive forces acting on the seat core over a greater number of cells. Front and rear openings (not shown) in the seat core 53 are sized for receiving fasteners, such as the threaded bolts 41 used in securing the temporary seat 51 to the seat frame 21.

With reference to FIG. 8, the core member 61 has a honeycomb ("cellular") construction, each cell 63 having a generally hexagonal cross-section. Honeycomb constructions are well-known for their efficient use of material in resisting compressive loadings. As an example, the seat core 53 of the preferred embodiment is approximately 20 inches in length, 17 inches in width, and 2 inches thick (e.g. the length of each cell 63 of the core member 61 is approximately 2 inches). This seat core 53 is capable of withstanding up to 40 lbs per square inch of compressive loading, or 13,600 lbs fully distributed. This loading capacity well exceeds that required to resist compressive forces that tend to move the upper surface defined by the top sheet 57 toward the lower surface defined by the bottom sheet 59 and bending forces that tend to bend the upper and lower surfaces out of their planes when a driver of the vehicle sits on the temporary seat 51. It is understood, however, that other cellular structures may be used without departing from the scope of this invention.

Figure 3:
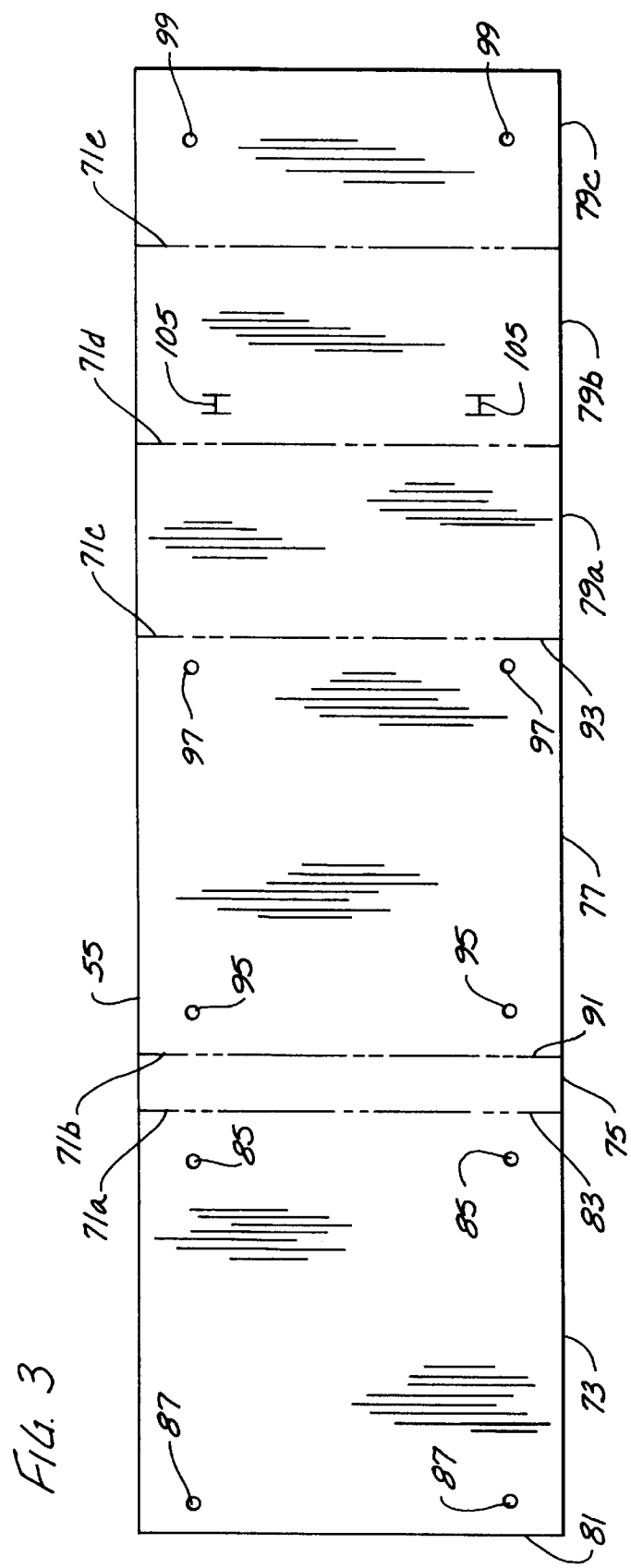
FIG. 3 is a top plan view of a blank used in forming a seat cover of this invention.

Referring now to FIG. 3, the seat cover 55 is formed from a single piece, generally rectangular blank sheet constructed of pasteboard, such as a double wall cardboard having a corrugated interior construction. However, it is contemplated that kraft paper, chipboard, paperboard or other suitable paper materials may be used for the seat cover without departing from the scope of this invention. Fold lines 71a–e divide the seat cover 55 into individual panels, including a bottom panel 73, an end panel 75, a top panel 77 and three back support panels 79a–c. When the seat cover 55 is assembled, as shown in FIG. 2, the bottom panel 73 underlies the lower surface of the seat core 53 and is adapted for engaging the mounting brackets 33, 35 of the metal seat frame 21 so that the seat core does not bear directly against the mounting brackets. When the driver sits on the temporary seat, the bottom panel 73 allows localized compression and bending forces applied to the temporary seat 51 by the mounting brackets 33, 35 to be distributed over a greater number of cells 63 of the seat core 53. The bottom panel 73, having a width substantially equal to that of the seat core 53, has a rear edge 81 positioned rearward of the rear seat core openings and extends forward to the fold line 79a at a front edge 83 of the bottom panel, adjacent the lower forward end of the seat core. Front and rear openings 85, 87 in the bottom panel 73 are located for alignment with the openings of the seat core 53 and with the threaded openings 37, 39 in the mounting brackets 35 of the seat frame 21.

The end panel 75 extends upward from the fold line 71a at the front edge 83 of the bottom panel 73 to the fold line 71b at a front edge 91 of the top panel 77, adjacent the upper forward end of the seat core 53. The end panel 75 covers substantially the entire forward end of the seat core 53 to protect the core member 61. The top panel 77 generally overlies the upper surface of the seat core to provide a surface on which the driver may be seated. When the driver sits on the temporary seat, the top panel 77 allows compression and bending forces applied to the temporary seat by the weight of the driver to be distributed over a greater number of cells 63 of the seat core 53. The top panel 77, having a width substantially equal to that of the seat core 53, extends rearward from the fold line 71b at the front edge 91 of the top panel 77 to the fold line 71c at a rear edge 93 of the top panel, rearward of the rear seat core openings. Front and rear openings 95, 97 in the top panel 77 are located for alignment with the openings of the seat core 53, the openings 85, 87 of the bottom panel 71 and the threaded openings 37, 39 in the mounting brackets 33, 35 of the seat frame 21.

The first back support panel 79a extends generally upwardly and rearwardly from the rear fold line 71c of the top panel 77, and the second panel 79b extends generally downwardly and rearwardly from the fold line 71d at the top of the first back support panel whereby the first and second back support panels define a back support having a generally triangular cross-section for supporting the back of the driver. The third back support panel 79c extends forwardly from the fold line 71e at the bottom of the second back support panel 79b and overlies a portion of the upper surface defined by the top sheet 57 of the seat core 53. In the preferred embodiment, this third back support panel 79c extends forward partially under the top panel 77 of the seat cover 55 and has openings 99 located for alignment with the rear openings 97 of the top panel. The top panel 77 and the third back support panel 79c are secured together by a staple 101 to inhibit the back support panel against movement relative to the top panel of the seat cover 55.

With reference to FIG. 6, slits 105 cut into the second back support panel 79b are adapted for receiving portions of seat parts (not shown) that are to be later assembled with the seat frame and permanent seat whereby these seat parts are securely transported to the customizer along with the temporary seat rather than being transported loosely or in individual packaging.

As shown in FIG. 1, conventional transparent adhesive tape 103 is wrapped around the seat core 53, and the top panel 77, third back support panel 79c and bottom panel 73 of the seat cover 55 to secure the seat cover on the seat core and to further secure the back support in its triangular configuration.

Referring to FIGS. 2 and 3, the seat core 53 and seat cover 55 are assembled to form the temporary seat 51 by first folding the bottom panel 73, end panel 75 and top panel 77 of the seat cover blank over the seat core. The openings 85, 87, 95, 97 in the bottom panel 73 and top panel 77 are aligned with the seat core openings. The first and second back support panels 79a, 79b are then folded to form the triangular shaped back support. The third back support panel 79c is folded under the first and second back support panels 79a, 79b to lie against the upper surface defined by the top sheet 57 of the seat core 53 and partially under the top panel 77 of the seat cover 55 so that the openings 99 in the third back support panel are aligned with the rear openings 97 in the top panel. The top panel 97 of the seat cover 55 and the third back support panel 79c are then stapled together. The adhesive tape 103 is wrapped around the seat core 53, top panel 77, third back support panel 79c and bottom panel 73 to complete assembly of the temporary seat 51.

To mount the temporary seat 51 on the metal seat frame 21, the temporary seat is placed over the mounting brackets 33, 35 of the seat frame so that the respective openings 85, 87, 99, 95, 97 in the bottom panel 73, seat core 53, third back support panel 79c and top panel 77 are aligned with the threaded openings 37, 39 of the mounting brackets 33, 35. Washers 42 are placed over the openings 95, 97 in the top panel 77 to distribute the compressive load applied to the seat by the heads of the bolts 41 when the temporary seat is fastened to the seat. The threaded bolts 41, are received in the openings and extend downward through the temporary seat 51 to engage the threaded openings 37, 39 of the mounting brackets 33, 35 for securing the temporary seat 51 to the metal seat frame 21.

In view of the above, it will be seen that the several objects of the invention are achieved and other advantageous results attained. For example, the honeycomb structure of the core member 61 of the seat core 53 is capable of supporting the driver of the vehicle without crushing or bending, thereby reducing the risk of damage to the metal seat frame 21. In addition, because the temporary seat 51 comprises only two pieces, e.g. the seat core 53 and the seat cover 55, the temporary seat is easily and quickly assembled. The use of paper materials for construction of the temporary seat 51 provides for a cost-effective seat which can also be easily disposed of prior to installation of the permanent seat.

As various changes could be made in the above constructions without departing from the scope of the invention, it is intended that all matter contained in the above description or shown in the accompanying drawings shall be interpreted as illustrative and not in a limiting sense.

What is claimed is:

1. In combination with a metal seat frame fixedly installed in a vehicle, a temporary seat for permitting a driver to sit on the metal seat frame to drive the vehicle prior to installation of a permanent seat for the vehicle, the temporary seat comprising a generally rectangular seat core made of pasteboard and supported on the metal seat frame, the seat core having an upper surface, a lower surface and a cellular construction spacing the upper and lower surfaces for resisting compressive forces tending to move the upper surface toward the lower surface and bending forces tending to bend the upper and lower surfaces out of their planes when the driver sits on the temporary seat, and a seat cover comprising a one piece sheet of pasteboard having fold lines therein, the seat cover including a bottom panel generally underlying the lower surface of the seat core and having openings therein for receiving fasteners into the seat core for securing the temporary seat on the metal frame, an end panel extending upwardly from a fold line at a forward end of the bottom panel and covering at least a portion of a forward end of the seat core, a top panel extending rearwardly from a fold line at the top of the end panel and generally overlying the upper surface of the seat core to provide a surface on which the driver may be seated, a back support extending upwardly from a fold line at a rear edge of the top panel for engaging the driver's body to inhibit the driver from sliding backwards off of the temporary seat.

2. The combination as set forth in claim 1 wherein the back support is generally triangular in cross section and comprises a first panel extending generally upwardly and rearwardly from the rear fold line of the top panel, and a second panel extending from a fold line at the rear of the first panel generally downwardly and rearwardly to the seat core.

3. The combination as set forth in claim 2 wherein the back support further comprises a third panel extending forwardly from a fold line at the bottom of the second panel and engaging the seat core.

4. The combination as set forth in claim 3 wherein the third panel extends partially under the top panel of the back support, the temporary seat further comprising means for securing the top panel, back panel and third panel of the back support to the seat core.

5. The combination as set forth in claim 4 wherein said securing means comprises adhesive tape wrapped around the seat core, bottom panel, top panel and third panel of the back support, and a staple to secure the top panel to the third panel of the back support thereby to secure the seat cover on the seat core and to secure the back support in its triangular configuration.

6. The combination as set forth in claim 4 wherein the seat core comprises a top sheet defining the upper surface of the seat core, a bottom sheet defining the lower surface of the seat core, and a core member between the top and bottom sheets having a generally honeycomb configuration comprising a plurality of cells, each cell having a generally hexagonal cross-section and opposing ends affixed to the respective top and bottom sheets.

7. A temporary seat for permitting a driver to sit on a metal seat frame fixedly installed in a vehicle to drive the vehicle prior to installation of a permanent seat for the vehicle, the temporary seat comprising a generally rectangular seat core made of pasteboard and supported on the metal seat frame, the seat core having an upper surface, a lower surface and a cellular construction spacing the upper and lower surfaces for resisting compressive forces tending to move the upper surface toward the lower surface and bending forces tending to bend the upper and lower surfaces out of their planes when the driver sits on the temporary seat, and a seat cover comprising a one piece sheet of pasteboard having fold lines therein, the seat cover including a bottom panel generally underlying the lower surface of the seat core and having openings therein for receiving fasteners into the seat core for securing the temporary seat on the metal frame, an end panel extending upwardly from a fold line at a forward end of the bottom panel and covering at least a portion of a forward end of the seat core, a top panel extending rearwardly from a fold line at the top of the end panel and generally overlying the upper surface of the seat core to provide a surface on which the driver may be seated, a back support extending upwardly from a fold line at a rear edge of the top panel for engaging the driver's body to inhibit the driver from sliding backwards off of the temporary seat.

8. The temporary seat as set forth in claim 7 wherein the back support is generally triangular in cross section and comprises a first panel extending generally upwardly and rearwardly from the rear fold line of the top panel, and a second panel extending from a fold line at the rear of the first panel generally downwardly and rearwardly to the seat core.

9. The temporary seat as set forth in claim 8 wherein the back support further comprises a third panel extending forwardly from a fold line at the bottom of the second panel and engaging the seat core.

10. The temporary seat as set forth in claim 9 wherein the third panel extends partially under the top panel of the back support, the temporary seat further comprising means for securing the top panel, back panel and third panel of the back support to the seat core.

11. The temporary seat as set forth in claim 10 wherein said securing means comprises adhesive tape wrapped around the seat core, bottom panel, top panel and third panel of the back support, and a staple to secure the top panel to the third panel of the back support thereby to secure the seat cover on the seat core and to secure the back support in its triangular configuration.

12. The temporary seat as set forth in claim 10 wherein the seat core comprises a top sheet defining the upper surface of the seat core, a bottom sheet defining the lower surface of the seat core, and a core member between the top and bottom sheets having a generally honeycomb configuration comprising a plurality of cells, each cell having a generally hexagonal cross-section and opposing ends affixed to the respective top and bottom sheets.

\* \* \* \* \*